United States Patent [19]

Todd, Jr. et al.

[11] Patent Number: 4,855,071

[45] Date of Patent: Aug. 8, 1989

[54] DEICING COMPOSITIONS COMPRISING ALKALINE EARTH OR ALKALI METAL CARBOXYLATES AND PROCESSES FOR THEIR PRODUCTION

[75] Inventors: Harold E. Todd, Jr., Pinole; Daniel L. Walters, San Francisco, both of Calif.

[73] Assignee: Chevron Research Company, San Francisco, Calif.

[21] Appl. No.: 144,359

[22] Filed: Jan. 14, 1988

Related U.S. Application Data

[63] Continuation-in-part of Ser. No. 77,148, Jul. 24, 1987, abandoned, which is a continuation-in-part of Ser. No. 3,097, Jan. 14, 1987, abandoned.

[51] Int. Cl.$^4$ .............................................. C09K 3/18
[52] U.S. Cl. .................................... 252/70; 427/220; 428/403
[58] Field of Search ..................... 252/70; 427/220; 428/403

[56] References Cited

U.S. PATENT DOCUMENTS

| | | |
|---|---|---|
| 2,308,289 | 1/1943 | Lawrence .............................. 252/70 |
| 4,243,415 | 1/1981 | Lowe, Jr. ............................... 106/13 |
| 4,247,331 | 1/1981 | Hamlin et al. ......................... 252/70 |
| 4,444,672 | 4/1984 | Gancy .................................... 252/70 |
| 4,588,512 | 5/1986 | Rippie .................................... 252/70 |
| 4,606,836 | 8/1986 | Gancy .................................... 252/70 |

OTHER PUBLICATIONS

Hawley, *The Condensed Chemical Dictionary*, Eighth Ed., 1971, p. 790.

*Primary Examiner*—Robert A. Wax
*Attorney, Agent, or Firm*—S. R. La Paglia; R. C. Gaffney

[57] ABSTRACT

Deicing compositions comprising an alkaline earth or alkali metal carboxylate having from 1 to 4 carbon atoms or mixtures thereof are provided which exhibit excellent handling characteristics. Also provided are processes for the preparation of such deicing compositions which comprise (a) preparing a slurry comprising an alkaline earth or alkali metal carboxylate of from 1 to 4 carbon atoms or mixtures thereof, said slurry having sufficient water that it is fluid and pumpable; distributing the slurry in a thin layer on discrete substrate particles; and drying said substrate particles.

60 Claims, 2 Drawing Sheets

DEICING COMPOSITIONS COMPRISING ALKALINE EARTH OR ALKALI METAL CARBOXYLATES AND PROCESSES FOR THEIR PRODUCTION

This application is a continuation-in-part of application Ser. No. 077,148, filed July 24, 1987, now abandoned, which is a continuation-in-part of application Ser. No. 003,097, filed Jan. 14, 1987, now abandoned.

BACKGROUND OF THE INVENTION

Removal and/or melting of snow and ice on roadways, bridges, sidewalks and the like is a major task in many areas.

Various chemicals have been used to assist in the removal and/or melting of snow and ice. Conventional road salt, has been used extensively in part due to its melting ability and also its relatively low cost. However, it has been found that the low cost of salt has been offset in part by the damage to roadways, bridges, underground cables (such as telephone or electrical cables) and the like, not to mention automobiles, caused by its use. Salt's corrosivity has led to damage to pavement and to the steel structure of bridges and surrounding structures. Moreover, the accumulation in run-off water has caused problems with vegetation. Accumulation in ground water has caused health problems with drinking water due to increased sodium contents. Other salts, such as calcium chloride, have been used; however, calcium chloride too has similar problems and causes accumulation of chloride ion in the environment, which is undesirable.

Accordingly, there has been extensive study on alternative deicing chemicals which are noncorrosive, environmentally acceptable and which are economically practical.

The Federal Highway Administration sponsored an extensive study by the Bjorksten Research Laboratory (BRL) on deicing chemicals. The study's report "Alternative Highway Deicing Chemicals" published March, 1980, identified calcium magnesium acetate (CMA) as a leading candidate for replacing road salt. Since the publication of the BRL report, various groups and individuals have been working on the preparation and testing of deicing agents comprising calcium magnesium acetate, calcium acetate and/or magnesium acetate. (See, e.g., U.S. Pat. Nos. 4,426,308, 4,444,672, 4,511,485, and 4,606,836.) However, preparing CMA economically on a commercial scale has been a problem. See, e.g., Gancy, Alan B. "Preparation of High Quality Calcium Magnesium Acetate Using a Pilot Plant Process", Federal Highway Administration (January, 1986). Dried large lumps of CMA in the product has been a problem, as has unacceptable levels of fugitive dust from product. See, e.g., "Continuous Production Calcium Magnesium Acetate/Sand Deicer" prepared by Cedarapids Inc. for Iowa Highway Research Board, June 3, 1985.

Processes used by others have exhibited problems with dusting of powdered lime and unacceptable levels of acid odor and vapor in recycled material, bed material, and even product.

Calcium magnesium acetate-coated sand deicing agents prepared by others have used a wetting agent, such as a cement-grinding aid, as a binder. See U.S. Pat. No. 4,588,512 to Rippie.

SUMMARY OF THE INVENTION

The present invention is related to deicing compositions comprising alkaline earth or alkali metal carboxylates of 1 to 4 carbon atoms ("AEC"), and processes for their preparation.

In particular, in one embodiment the present invention is directed to deicing compositions having good crush strength, high bulk density, high particle specific gravity, and resistance to attrition which comprises an alkaline earth or alkali metal carboxylate of from 1 to 4 carbon atoms or mixtures thereof ("AEC") having a plurality of thin layers of carboxylate distributed on discrete substrate particles without a wetting agent. The layers of carboxylate are substantially homogeneous. Preferred AEC's include calcium acetate, magnesium acetate, potassium acetate, calcium magnesium acetate or mixtures thereof. Preferred are deicing compositions which are substantially free from unreacted magnesium base. Especially preferred are deicing compositions having calcium:magnesium molar ratios of about 6:4 to about 2:8, more preferably from about 1:1 to about 3:7. Especially preferred are calcium:magnesium ratios of about 3:6 to about 3:7. Preferred substrates include traction aids or preformed AEC particles.

In one preferred embodiment, the deicing compositions of the present invention comprise a plurality of calcium magnesium acetate ("CMA") layers which are substantially free of unreacted magnesium base on substrate. Particularly preferred are deicing compositions having a calcium:magnesium molar ratio of from about 6:4 to about 2:8, more preferably from about 1:1 to about 3:7. Especially preferred are such deicing compositions without a wetting agent. Preferred substrates include traction aids, for example sand, and preformed CMA particles.

Among other factors, the present invention is based on our finding that the present invention provides superior deicing compositions comprising an AEC distributed on a discrete substrate without a wetting agent, said deicing compositions having advantageous handling characteristics including, for example, the following properties: hardness, resistance to attrition, high crush strength, high bulk density, high particle specific gravity, self-wetting and surprisingly good ice melting. Moreover, the process of the present invention provides an advantageous deicing composition in good yields while decreasing acid odor and the portion of AEC which goes to dust.

In one embodiment, the process of the present invention provides deicing compositions comprising CMA which are substantially free of unreacted magnesium base and which are substantially anhydrous. By "substantially anhydrous" is meant less than about 5 percent by weight water. Preferred are compositions comprising less than about 2.5 percent by weight water.

Preferred are deicing compositions which comprise AEC comprising calcium carboxylates, magnesium carboxylates, calcium magnesium carboxylates or potassium carboxylates or mixtures thereof. Preferred are AEC where the carboxylate portion is acetate.

According to a preferred embodiment of the present invention, deicing compositions comprising calcium magnesium acetate ("CMA") having a calcium:magnesium molar ratio of about 6:4 to about 2:8 are provided which exhibit good handling characteistics such as high crush strength and resistance to attrition. Thus, the present invention provides deicing compositions comprising isodimensional pellets of CMA which have bulk densities of at least 40 pounds per cubic foot, particle specific gravities greater than about 1.2, and attrition of less than about 3 percent (as measured by ASTM D 4058-81). This is surprising in view of teachings that magnesium in CMA weakens pellet structure and thus pellets having magnesium contents greater than a calcium:magnesium molar ratio of 10:2 are disadvantageous and not preferred (see, e.g., U.S. Pat. No. 4,488,978).

In one embodiment the present invention provides deicing compositions comprising calcium magnesium acetate ("CMA") which are essentially free of unreacted magnesium base (e.g., magnesium oxide, magnesium hydroxide or the like) and processes for their preparation. Also, deicing compositions having high magnesium contents relative to calcium are provided. This is surprising in view of teachings of the relatively low reactivity of magnesium bases. Preparation of CMA deicing compositions by other processes has resulted in the presence of unreacted magnesium oxide or magnesium hydroxide in the product. Since magnesium acetate is a superior deicing agent in comparison to unreacted magnesium base, the presence of unreacted base in the product deicing agent is disadvantageous. Accordingly, one aspect of our invention is directed to a deicing composition which comprises CMA and is essentially free of unreacted magnesium base.

Also in a preferred embodiment, the processes of the present invention provide deicing compositions which are substantially anhydrous. By "substantially anhydrous" is meant that the compositions, after the distributing and drying steps have less than about 5 percent by weight water (about 0.4 mole water per mole AE base. Preferably, the compositions comprise less than 2.5 percent by weight water (on the order of 0.2 mole water per mole AE base).

Preferred are deicing compositions comprising CMA having a calcium:magnesium molar ratio of about 6:4 to about 2:8, more preferably from about 1:1 to about 3:7. Especially preferred are deicing compositions having a calcium magnesium ratio of about 3:6 to about 3:7.

Preliminary studies by methods such as electronmicroscopy indicate that some of the CMA-containing compositions of the present invention may have a distinctive crystalline structure. Compositions comprising a salt of calcium magnesium acetate where both calcium and magnesium are co-crystallized together are disclosed in our copending U.S. patent application Ser. No. 77,148, the disclosure of which is incorporated herein by reference.

This invention is also directed to a slurry process for the manufacture of a pelleted deicing composition having improved ice melting and storage and handling characteristics.

According to a preferred embodiment of the present invention, these processes provide CMA compositions having calcium:magnesium ratios of about 1:1 to about 3:7 which are substantially free of unreacted magnesium base and substantially anhydrous. The compositions provided thereby comprise substantially isodimensional pellets which have high bulk densities (of at least about 40 pounds/cubic foot) particle specific gravities greater than 1.2 and attrition of less than 3.0 percent (measured by ASTM D 4058-81).

In one aspect the process of the present invention is directed to a process of preparing a deicing composition which comprises: (a) preparing a slurry comprising an alkaline earth or alkali metal carboxylate ("AEC") where the carboxylate group has from 1 to 4 carbon atoms or mixtures thereof, said slurry containing sufficient water so that said slurry is fluid and pumpable; (b) distributing the slurry in a thin layer on discrete substrate particles; and (c) drying said substrate particles. The substrate particles may comprise either an inert support, such as for example a traction aid, fertilizer (such as urea, ammonium phosphate, phosphate rock or the like) or other aggregate; or preformed AEC particles. The distributing and drying steps may be repeated to give a plurality of thin layers of AEC until the deicing agent particles reach the desired particle size. To be fluid and pumpable, said slurry generally contains about at least about 50% by weight water. Preferred are slurries containing at leastd about 55% to about 68% water. Preferably, the slurry of step (a) is heated to a temperature of about 100° F. to about 250° F.; more preferably, to a temperature of about 170° F. to about 200° F. The distributing and drying steps may be performed at substantially the same time.

Preferred are slurries having an alkaline pH. More preferred are slurries having a pH of about 7 to about 8.5. Especially preferred are slurries having a pH of about 7.5 to about 8.

The present invention is also directed to the process of preparing a slurry comprising an alkaline earth or alkali metal carboxylate where the carboxylate group has from 1 to 4 carbon atoms or mixtures thereof and the use of said slurry in the aforementioned process for preparing a deicing composition.

The process of preparing said slurry comprises reacting an alkaline earth or alkali metal base or mixtures thereof ("AE base"), water and carboxylic acid having from 1 to 4 carbon atoms or mixtures thereof to give a slurry comprising alkaline earth or alkali metal carboxylate or mixtures thereof. Sufficient water should be used in the process to give a fluid, pumpable slurry. Such slurries usually contain at least about 50% by weight water. Preferred are slurries containing from about 55% to about 68% water.

Various materials may be used as the substrate upon which the AEC slurry is distributed. Preferred substrates include traction aids and preformed AEC particles.

The process of the present invention produces particulate AEC deicing compositions of sufficiently high density that they penetrate ice rapidly and have a uniformity and pellet hardness such that a maximum of deicing effectiveness is obtained with a minimum of dust problems during handling and application.

The deicing compositions prepared according to the process of the present invention are substantially isodimensional and may have particle sizes in a wide or narrow size range with an average size that is large or small as desired. For example, deicing compositions may be prepared having a size range as small as 48 Tyler mesh (about 0.295 mm diameter) to about 0.371(5) inches (about 9.5 mm diameter). In one embodiment, the size is in the −5 to +28 mesh size range. Such particle sizes are preferred due, in part, to their ease of use with conventional machinery for the distribution of deicing compositions. Product size may be controlled by selecting an appropriate mesh size product screen. For example, a 7-mesh product (fines) screen may be used to meet a specification of 90%+8-mesh; a 7-and-$\frac{1}{2}$ mesh screen may be used to meet a specification of 90% minimum+9-mesh.

DEFINITIONS

As used herein, the following terms have the following meanings, unless expressly stated to the contrary.

The term "slurry" indicates a solution of a soluble substance possibly above the saturation point for the soluble substance, whether or not the solution contains non-soluble suspended material. (See, e.g., U.S. Pat. No. 3,333,297.) For example, an AEC slurry may comprise an AEC solution or a solution comprising both dissolved, undissolved AEC, and unreacted raw materials.

The term "alkaline earth" refers to elements in Group IIa of the Periodic Table, and includes, for example, beryllium, calcium, magnesium, strontium, barium, radium, and the like.

The term "alkali metal" refers to metallic elements in Group Ia of the Periodic Table and includes, for example, lithium, sodium, potassium, rubidium, cesium, francium, and the like.

The term "AE base" refers to alkaline earth or alkali metal bases or mixtures thereof which are capable of reacting with a carboxylic acid to form a carboxylate salt. Typical AE bases include oxides, hydroxides, carbonates and the like of the alkaline earth and alkali metal elements. Such AE bases may contain one or more of the individual alkaline earth or alkali metal elements in various combinations and molar ratios.

The term "CM base" refers to AE bases wherein said alkaline earth or alkali metal portion comprises calcium, magnesium or mixtures thereof.

The term "magnesium base" refers to AE bases where said alkaline earth or alkali metal portion comprises magnesium.

The term "AEC" refers to alkaline earth or alkali metal carboxylates or mixtures thereof where the carboxylate group has from 1 to 4 carbon atoms. The term AEC includes single salts such as calcium acetate, magnesium acetate, and potassium acetate as well as mixed salts such as calcium magnesium acetate as well as physical mixtures or products of cocrystallization of single and/or mixed salts.

The term "CA" refers to both anhydrous calcium acetate and its hydrates.

The term "MA" refers to both anhydrous magnesium acetate and its hydrates.

The term "calcium magnesium acetate" or "CMA" refers to calcium magnesium acetate compositions having the empirical formula $Ca_xMg_y(Acetate)_{2(x+y)}$, where x is moles calcium and y is moles magnesium, and thus refers to calcium magnesium acetate compositions which may have essentially any molar ratio of calcium to magnesium.

The term "calcium magnesium ratio" refers to ratios of moles calcium to moles magnesium.

Unless stated otherwise, all percents refer to percent by weight.

The term "traction aid" refers to materials which help improve traction when applied to a slippery surface. Thus, the term includes inert supports which have good antislip properties and includes materials such as sand, crushed limestone, pulverized corncobs, nutshells (such as walnut shells, pecan shells, almond shells or the like), expanded shale, vermiculite, pumice, cinders, other substantially insoluble mineral with good anti-slip properties, or the like.

The term "mesh" refers to mesh sizes determined according to the Tyler standard sieve series.

DETAILED DESCRIPTION OF THE INVENTION

The process of the present invention has two aspects. The first aspect involves production of a fluid, pumpable AEC slurry. The second aspect involves providing said AEC slurry, distributing heated AEC slurry in a thin layer onto discrete substrate particles and drying the substrate particles to give a particulate deicing composition.

Production of AEC Slurry

Typically, the AEC slurry is prepared by mixing AE base, carboxylic acid and water, preferably in an agitated vessel. Preferably AE base and water are first mixed, and then carboxylic acid is added. Preferably the AE base is reacted with sufficient carboxylic acid to give an AEC slurry having a pH which provides complete reaction of AE base and minimal acid vapor loss and also results in an AEC composition with low corrosivity. The ratio of carboxylic acid to AE base is carefully adjusted to give substantially complete reaction of AE base and to minimize volatilization of unreacted acid during the subsequent distributing and drying steps. Accordingly, sufficient carboxylic acid is added to react with the AE base to give an AEC slurry with a pH of about 7 to about 8.5, preferably from about 7.5 to 8.0 (when diluted 1 part slurry to 2 parts water) which is substantially free of acid odor. Such slurries result in an AEC product having a pH of about 9 to about 10 (when diluted 1 part product to 9 parts water). Preferred AEC slurries include CMA slurries having a pH of about 7.5 to about 8.0. Slurries having low pH's (about 5 to 6) may be used, but may result in increased production of oversized product during the distributing and drying step and in unacceptably high acetic acid emissions from an environmental standpoint.

Sufficient water is added, either alone or as part of a carboxylic acid solution, to give a fluid, pumpable slurry which does not solidify. Slurries having insufficient water may abruptly solidify, particularly if heated. We have found that if a slurry contains less than about 50% by weight water (where the AEC is CMA, on the order of about 30 moles water per mole CMA), excessive thickening of the slurry may occur at about 170° F. As lower slurry moistures are employed, the resulting slurry must be heated to a higher temperature. Accordingly, preferred are slurries having at least about 50% water. Particularly preferred are AEC slurries having from about 55% to about 68% water. Although AEC slurries having greater amounts of water may be used, such additional water later must be removed in the drying step and thus slurries having higher water contents may be less economical and disadvantageous due to increased drying costs. Also, using lower slurry moistures may require heating the resulting slurry to a higher temperature before the distributing and drying steps.

When the AE base(s) used is hydrated dolomitic lime and/or reactive magnesium oxide, and the carboxylic acid is acetic acid, the reaction time is generally relatively short, on the order of twenty minutes or less. Less reactive AE bases may be used by increasing the reaction time as needed. However, it is preferred to age the slurry, as by allowing it to flow through one or more vessels before the distributing and drying steps.

The alkaline earth and alkali metal bases ("AE bases") used in the process of the present invention include various reactive alkaline earth oxides, hydroxides and carbonates or alkali metal hydroxides and carbonates which may contain various molar ratios of individual alkaline earths or alkali metals or mixtures thereof. Preferred alkaline earths include calcium and magnesium. Preferred alkali metals include potassium. Suitable calcium and magnesium bases ("CM bases") which may be used include calcium and magnesium oxides, hydroxides and carbonates and mixtures thereof, including various types of lime, such as hydrated or slaked limes, unslaked limes, limestone, magnesian lime, dolomitic lime; magnesia, calcia and the like.

Preferred CM bases include dolomitic lime, especially type S hydrated dolomitic lime, magnesium oxide and magnesium hydroxide. Dolomitic lime has a calcium:magnesium ratio of approximately 1:1. If deicing compositions having higher magnesium contents are desired a reactive grade of magnesium oxide or other magnesium base may be added to the dolomitic lime in an amount sufficient to result in the desired calcium:magnesium ratio.

Various sources of carboxlyic acids and mixtures thereof may be used in the preparation of the alkaline earth carboxylates. The source of the carboxylic acids is not critical. Accordingly, commercially available carboxylic acids may be used such as acetic acid, propionic acid, formic acid and the like, as well as other carboxylic acids, or mixtures thereof. The carboxylic acids may be produced by chemical and alternative methods such as fermentation, including fermentation of cellulosic materials by microorganisms and the like.

The preferred carboxylic acid is acetic acid.

Production of Deicing Composition

Preferably, a fluid, pumpable AEC slurry is heated to a temperature of about 100° F. to about 250° F., more preferably from about 170° F. to about 200° F. We have surprisingly found that heating the AEC slurry to a relatively high temperature, preferably from about 170° F. to about 200° F. improves efficiency in the subsequent distributing step and thus yield. When slurries are not heated to a sufficiently high temperature, for example, less than about 100° F., in the distributing step much of the slurry may go to dust rather than to forming a thin layer on substrate particles. Such dust must be collected in a high efficiency dust collector such as a baghouse or wet scrubber and then is generally recycled generally with additional water. Thus, the overall amount of water which must be removed in the drying step increases which increases manufacturing costs.

Moreover, we have discovered that another beneficial effect of operation with high slurry temperature was that the hardness of the CMA coating increased by 50% for high slurry temperature operation compared to low slurry temperature operation. This increase in the hardness of the CMA coating provided a product that can better withstand degradation to form dust and fines during shipping and storage of the product.

As noted previously, the AEC slurry must contain sufficient water so that it remains fluid and pumpable and does not solidify. Such slurries generally contain at least about 50% water. Particularly, preferred are slurries having about 55% to about 68% water. Low slurry water content may also result in formation of higher dust and fines in the distributing step. Higher than required slurry water contents may result in increased drying costs and reduced manufacturing efficiency.

In the process of the present invention, the AEC slurry is distributed onto discrete substrate particles to give a thin layer of AEC on substrate particles. Atomizing air pressures in the range of about 0 to 100 psig may be used, preferably from about 0 to about 20 psig. We have surprisingly found that by using no atomizing air in distributing the slurry on the substrate particles results in increased production and decreased the amount which went to dust and fines. Preferably, said thin layer of AEC substantially surrounds said substrate particles and forms a substantially continuous layer. The layered substrate particles are then dried. The layered substrate particles may be recycled through the distributing and drying steps adding additional thin layers of AEC with each distributing and drying cycle to give a plurality of AEC layers on said substrate particles until the desired particle size for the deicing composition is obtained.

Suitable substrate particles may be inert supports such as, for example, traction aids, fertilizer (such as urea, ammonium phosphate, phosphate rock or the like), or other aggregates, or preformed AEC particles. Particularly preferred substrate particles include sand, especially sand of −10 to +20 mesh size, and preformed AEC particles. Preformed AEC particles may be obtained by crushing deicer compositions having layers of AEC on substrate such as that prepared by the present process and separating AEC material from inert support (if any). Preformed AEC particles may be provided by recycling a set portion of product of desired size to obtain oversized particles which are then crushed to provide a supply of preformed AEC particles.

The distributing and drying steps optionally may be carried out simultaneously, such as by distributing a thin layer of AEC slurry on substrate particles in the presence of a heated gas or said distributing and drying steps may be performed separately in sequence.

In one preferred embodiment the distributing and drying steps are performed substantially simultaneously. In this embodiment, the slurry is distributed on to a dense falling curtain of substrate particles in the presence of a heated gas (such as air). The heated gas contacts the substrate particles at substantially the same time as the slurry is distributed in a thin layer on the substrate particles. Droplets of slurry are distributed on the substrate particles, and the water flashed off leaving a thin coating of dry AEC on substrate particles. The flow rate and temperature of the heated gas are controlled such that the water from the thin layer of AEC slurry on the substrate particles is flashed off. Optionally, undersized substrate particles are recycled through the combined distributing and drying step to give additional layers of AEC as necessary to give the desired particle size for the substantially isodimensional product. Where preformed AEC particles comprise the substrate, product size or oversized particles may be crushed to obtain a continuous supply of preformed AEC particles or undersized particles may be used without crushing.

The layered substrate particles may be screened to remove fines which may be recycled to receive additional layers of AEC; oversized material may be fed to a suitable crusher.

Preferred alkaline earth carboxylates ("AEC") include calcium magnesium acetates ("CMA"). Especially preferred are calcium magnesium acetates wherein the ratio of calcium:magnesium molar ranges from about 6:4 to about 2:8. Especially preferred are those having calcium:magnesium molar ratios of about 1:1 to 3:7.

Since the present process may be used to prepare deicing agents having various ratios of individual alkaline earths and alkali metals, the type and amount of alkaline earth or alkali metal base is controlled to give the desired content of individual alkaline earths and alkali metals. Accordingly, use of a lime, such as Type S hydrated dolomitic lime, results in a deicing agent having a calcium:magnesium ratio of about 1:1.

Figure 1:
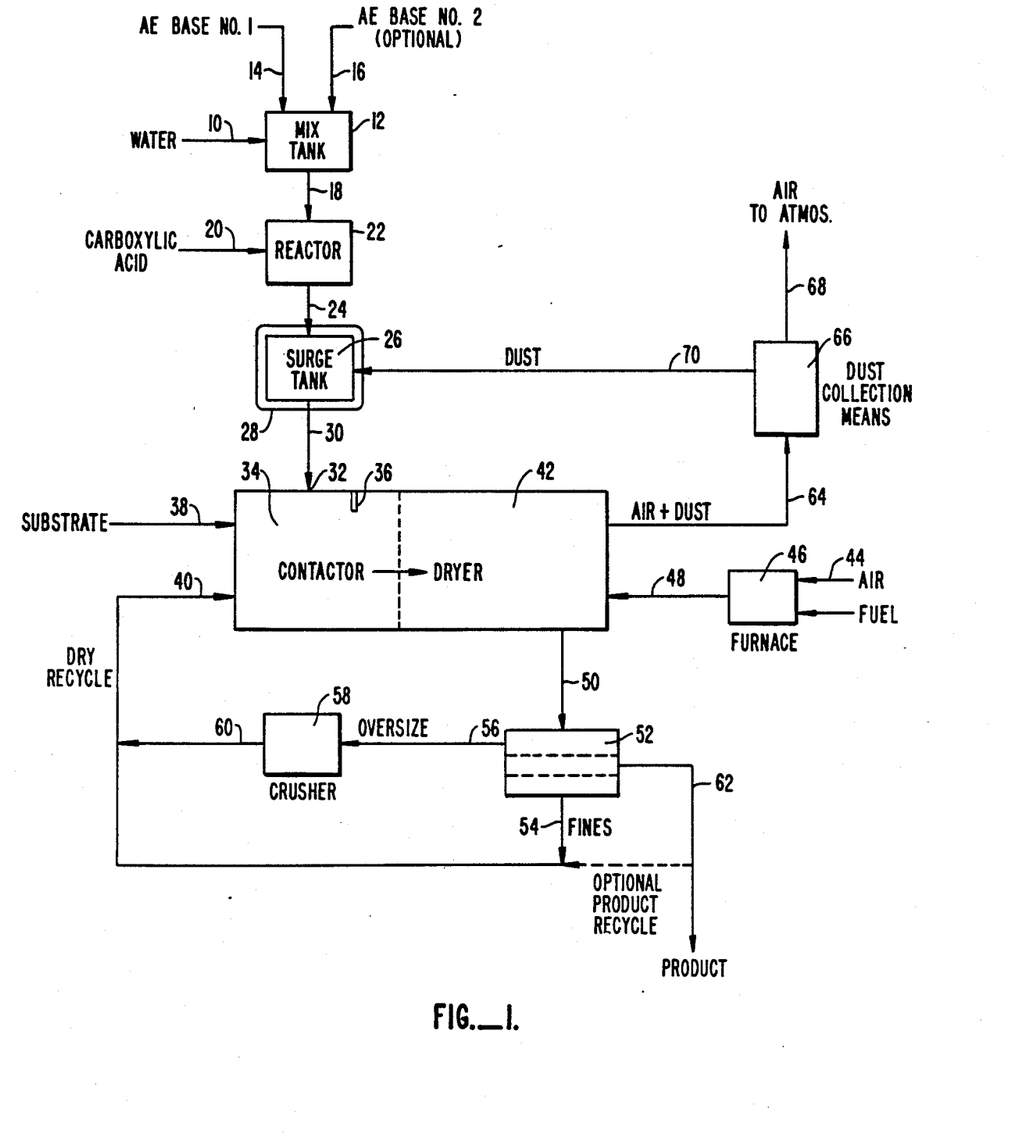
FIG. 1 is a schematic drawing showing the steps of one embodiment of the present invention.

FIG. 1 illustrates one embodiment of the process of the present invention.

In FIG. 1, water is fed through line 10, which has a suitable means for the control of rate of flow into mix tank 12. Simultaneously, AE base through line 14 and, if more than one AE base is used, AE base No. 2 through line 16 are fed into tank 12. If additional AE bases are used, additional feed lines feeding into tank 12 may be used. The mixture overflows through line 18 into optionally agitated reactor 22. Carboxlyic acid is fed through line 20 into reactor 22 whereby it reacts with the AE base to give an AEC slurry. The AEC slurry overflows through line 24 into surge tank 26. Dust recovered from dust collector 66 is fed into surge tank 26 with additional water, if indicated. Heating means 28 heats the slurry in surge tank 26. Suitable heating means 28 include a steam jacket, steam coil or other heating means. Heated AEC slurry is pumped from surge tank 26 through line 30 through atomizing nozzles 32 so positioned in contactor 34 so that the sprayed slurry impinges on a dense curtain of substrate particles cascading from lifters 36 in contactor 34. Substrate particles enter contactor 34 through line 38 or AEC layered substrate through recycle line 40. The layered substrate particles are dried in dryer 42. A stream of gas is drawn through line 44 into heating means 46 (where it is heated by natural gas or other suitable heating means) and then the heated gas is drawn through line 48 into dryer 42. In one preferred embodiment contactor and dryer means are combined so that substrate particles are dried immediately after coating (see FIGS. 2 to 4). In another embodiment contactor and dryer means are separate. Layered substrate exits dryer 42 through line 50 and goes into separator means 52. Separator means 52 removes fines which are removed and returned through line 54-40 to contractor 34 for additional coating. Oversize material goes through line 56 into crusher 58 (suitable crushers include hammermill or roll crushers) and then is returned through line 60-40 to contactor 34. Product is withdrawn through line 62 and then sent to shipping or storage. (Where substrate particles comprise AEC particles, optionally a set portion of product may be recycled to contactor 34 to obtain oversized material which is then crushed to generate AEC substrate particles.) Alternately, product may be cooled in a rotary drum cooler or fluid bed cooler or other suitable cooling means.

Substrate particles are continuously fed through line 38 (or recycle 40) into contactor 34. Adjustments are made in the quantity of material in contactor 34 and the internal configuration of contactor 34 to minimize the return of discharge particles and to provide the most uniform level coating on each particle.

Air and dust are removed from dryer 42 through line 64. Dust is recovered in dust collector means 66. Suitable dust collector means 66 include, for example, a baghouse, wet scrubber or other conventional dust removing systems. Air is discharged to the atmosphere (outside) through line 68. Recovered dust collected in dust collector means 66 is returned through line 70 to surge tank 26. (Alternatively, where dust collector means comprise a wet scrubber, an AEC dust and water mixture may be returned to mix tank 12 through a conduit.)

In the process of our invention, either preformed or undersized AEC particles or inert support, including traction aids, may be used as substrate particles.

Figure 2:
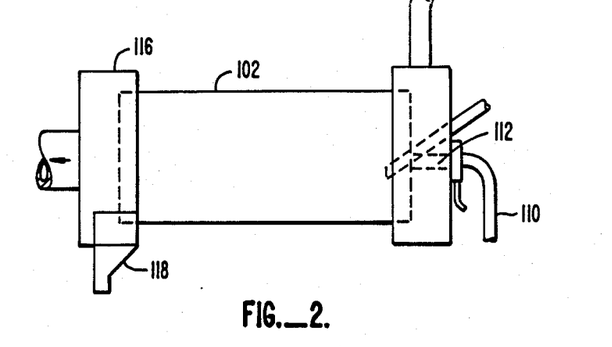
FIG. 2 is an elevational view of semi-diagrammatic character which shows a combined distributor-dryer apparatus used in one embodiment of the process of the present invention.
Figure 3:
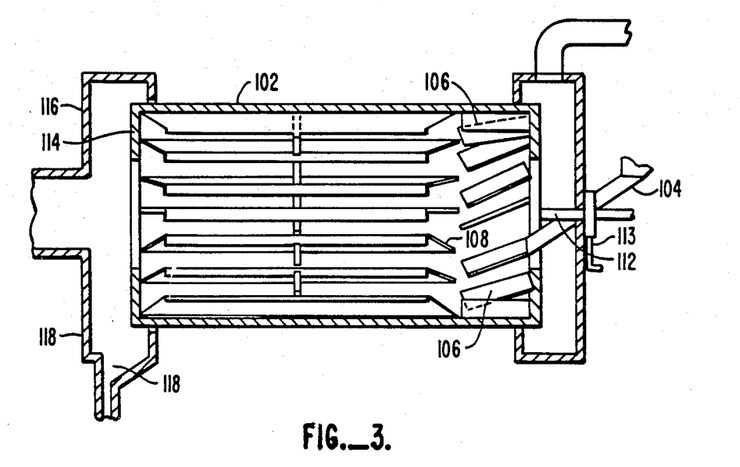
FIG. 3 is a longitudinal section through the drum element of FIG. 2 and its end appurtenances.
Figure 4:
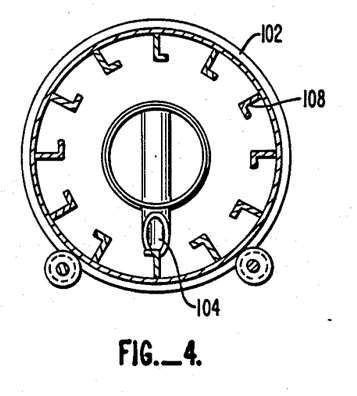
FIG. 4 is a transverse sectional view of the drum element of FIG. 2.

FIGS. 2 to 4 show a combined distributor-dryer apparatus suitable for use with a preferred embodiment of the present invention. That apparatus is more fully described in U.S. Pat. No. 3,333,297 to Tytus et al which is incorporated herein by reference.

In brief, the combined distributor-drying apparatus shown in FIGS. 2 to 4 includes hollow elongated drum 102 which is mounted for rotation. Substrate enters drum 102 through conduit 104. Vanes 106 help feed substrate delivered by conduit 104 toward vanes 108 which line drum 102. Vanes 108 are shown in cross section in FIG. 4. AEC slurry is delivered through conduit 110 to spray nozzle 112. Atomizing air pressures in the range of about 0 to about 100 psig, preferably in the range of about 0 to about 20 psig. However, it is preferred that no additional atomizing air is used with the atomizing nozzle. We have found that not using atomizing air decreased the amount of slurry that went to dust and fines. This is surprising, since it was thought that use of atomizating air in the range of about 20 to 80 psig on the nozzles was required to prevent coated product from sticking to the lifters and to have slurry adhere to the substrate. A hot gas is supplied to the drum by conduit 113. As drum 102 rotates, vanes 108 act to shower substrate particles in curtains vertically and longitudinally of the drum said curtains moving across the drum. Slurry is sprayed through nozzle 112 on the plurality of traveling curtains of substrate particles distributing a thin layer on the particles which is dried by the hot drying gases passing through the drum. The spraying and drying action is repeated as the substrate particles traverse drum 102 to reach dam 114 at the exit end of drum 102. Manifold 116 receives both hot gases and substrate particles. Substrate particles enter receiving means 118 from where they are sized, and if indicated, recycled into drum 102.

In another embodiment of the process of the present invention, separate distributing and drying means are employed. Suitable apparatus for separate distributing means include drum granulators, pan granulators, pug mills and other conventional granulating and pelletizing machinery. Suitable separate drying means include rotary drum and fluid bed dryers as well as other conventional means for drying pelleted or granulated materials. Such apparatus is adjusted to give a sufficient recycle ratio to provide build-up of layers on substrate particles to give the desired size product.

Unless stated otherwise, measurement of slurry pH was performed after diluting the slurry one part slurry to two parts water and then measuring the pH of the thusly diluted mixture.

EXAMPLES

The following non-limiting examples are typical of deicing compositions prepared according to the process of the present invention. The preparations of Examples 1 to 7 were performed using apparatus having combined distributing and drying means substantially as shown in FIGS. 2 to 4.

Example 1

Batchwise Preparation of Calcium Magnesium Acetate on Sand

A calcium magnesium acetate (CMA) slurry was prepared batchwise by the following procedure. Seventy-two (72) gallons of water was charged to an agitated, ventilated reaction tank. One hundred fifty (150) pounds of Type S hydrated dolomitic lime was added gradually. A uniform suspension of lime in water resulted. Glacial acetic acid, Technical Grade, was pumped into the tank at a rate of about 1.0 lb/minute. The heat of reaction of the acid and lime resulted in an increase in the temperature of the mixture as the acid was added. When 186.5 lbs of acid had been added, the slurry became excessively thick. The slurry temperature was 130°. An additional 8 gallons of water was added to thin the slurry. Acid addition was resumed until a total of 239 lbs of acid had been added. The slurry pH was 8.2 initially and rose to 8.8 after standing overnight. The slurry moisture was 68%. This moisture was a little less than calculated by a mass balance and indicated that a small amount of evaporation had occurred. Subsequent batches of slurry were made in a similar way except that a larger quantity of water was added at the start to avoid thickening during the reaction stage.

The CMA slurry was then converted into a particulate deicing composition comprising CMA coated onto sand by the following methods. A pilot plant rotary drum, 3 feet diameter by 12 feet long was used. The drum was equipped with internal lifters, an internal dam and an external solids recycle system. Also included was an air system consisting of a fan, an inlet air heater and a baghouse dust collector on the outlet air.

Five hundred (500) pounds of No. 2 Sandblasting Grade sand was charged into the rotary drum. The system was preheated to about 150° F. The CMA slurry at a temperature of about 112° F. was pumped to an atomizing nozzle positioned to spray onto the falling curtain of sand particles inside the rotating drum. The inlet air was heated to 575° F. The slurry spray rate was adjusted to 0.3 gpm as indicated by a magnetic flowmeter. A Spraying Systems Company nozzle, body number 60150 and cap number 120, was used to atomize the slurry with an atomizing air pressure of 50 psig. Solids which discharged from the outlet of the rotary drum were recycled back to the inlet of the drum. The atomized slurry coated the sand particles and was simultaneously dried. As this process continued, a uniform off-white coating of CMA was formed on the sand particles. There was no sign of particle agglomeration. Inspection of the baghouse showed that a large amount of very fine lightweight dust was collecting in the baghouse hopper. Spraying was continued and the amount of CMA coating on the sand increased steadily with time. As spraying was continued, samples were withdrawn over time that consisted of particles with 16%, 27%, 36% and 56% CMA coating. Calculations showed that the spray yield (weight percent of the CMA sprayed that goes to a coating on the sand rather than to dust) was only 42%. (This meant that there would be a very high dust recycle required in a commercial process and the production rate would be substantially lowered and the drying costs would be substantially increased because of the low spray yield.)

The composite particles consisted of individual sand particles coated substantially evenly with an outer shell of CMA. The crushing strength of the CMA shell was measured and found to decrease as the percent CMA increased. With the highest percent CMA, and the softest shell, the shell was sufficiently hard to withstand normal storage and handling without appreciable breakage. The crushing strength of the outer shell of the 56% CMA pellets was 2.8 lbs force as measured with a force gauge.

The pH of a solution of the product was 10.2 for 1 part 27% CMA product mixed with 3 parts water. Tests of the final product containing 56% CMA showed a bulk density of 60.8 lbs/cu.ft.

The ice melting tendency of the 36% CMA product was tested at 27° F. The pellets stuck to the ice immediately. Visible liquid formed in 5 minutes and visible melting continued for 90 minutes. A liquid run-off of 129 milliliters was measured for 100 grams of 36% CMA pellets after 90 minutes melting time.

Example 2

Production of CMA on Sand Deicing Composition with Increased Yield

The basic procedure outlined in Example 1 was followed. Since it was apparent that a large part of the CMA in the slurry spray was going to dust rather than to a coating on the particles, tests were run to measure the spray coating efficiency (percentage of CMA in the spray which coated substrate particles) at different slurry temperatures. This was done by analyzing the slurry for percent water combined with reading the slurry tank level to determine the amount of CMA input, and measuring of the initial weight of sand placed in the rotary drum, then analyzing the CMA coated sand for the percent CMA present as a coating on the sand particles. We discovered that the spray yield was primarily dependent on the slurry temperature. Other variables such as slurry moisture, excess unreacted lime, particle temperature and spray atomization had much smaller effects on the coating efficiency. The results for runs with CMA slurry prepared by the reaction of dolomitic lime and acetic acid are shown in Table I. The data show that spray coating yields were much higher when the slurry was heated above 155° F.

For a practical process the CMA dust that was formed must be collected and recycled to the slurry tank along with additional water. Tests were run in which all of the slurry was made from reslurried dust. The coating yields for that case were also very dependent on slurry temperature as shown in Table II.

The data in Table II showed that the spray coating yield was again much higher for heated slurry, however, it was not as high for the reslurried dust as for slurry made by reacting lime and acid. The ability to control dust formation by small changes in slurry temperature was surprising. The slurry appearance was not changed greatly by heating and such a dramatic effect on coating yield would not be expected from solubility data or from previous experience with slurry granulation.

We have discovered that another beneficial effect of operation with high slurry temperature was that the hardness of the CMA coating increased by 50% for high slurry temperature operation compared to low slurry temperature operation. This increase in the hardness of the CMA coating provided a product that can better withstand degradation to form dust and fines during shipping and storage of the product.

TABLE I

Effect of Slurry Temperature on the Spray Coating Yield in the Slurry Process for Making Calcium Magnesium Acetate Coated Sand

| Slurry Conditions: | | |
|---|---|---|
| Temperature, °F. | 135–150 | 155–165 |
| Moisture, % | 62–70 | 62–70 |
| Spray Coating Yield. % | 52–61 | 78–90 |

TABLE II

Effect of Slurry Temperature on Spray Yield in the Slurry Process for Coating Sand With CMA Using Reslurried Baghouse Dust

| Slurry Conditions: | | |
|---|---|---|
| Temperature, °F. | 79 | 170 |
| Moisture, % | 65 | 66–67 |
| Spray Coating Yield, % | 0 | 62 |

Example 3

Continuous Production of CMA-coated Sand

CMA coated sand was prepared by a continuous process using the same pelletizing apparatus that was described in Example 1.

Sand was fed continuously to the inlet end of the rotary drum. Slurry was sprayed onto the moving solids in the front portion of the drum. Conditions used in initial runs gave a high rate of discharge of solids from the exit end of the drum; these solids were continuously returned to the inlet end of the drum. A portion of the exit solids was removed at frequent intervals to maintain a consistent quantity of solids in the drum. With the condition of a high solids recycle rate it was readily seen that the coated sand particles had a wide range of coating thicknesses. A portion of the fresh sand feed was traveling through the drum rapidly and did not receive much CMA coating. Other portions of the sand feed had longer residence time in the drum and received higher coating levels. The product had a salt-and-pepper appearance, since it was comprised of a mixture of lesser coated sand and higher coated sand particles.

The rotary drum was equipped with an intermediate dam which comprised an annular member of a depth that was about 15% of the drum diameter. This dam ensured a hold-up of granular material in the drum so that a large quantity of it will be available in the bed in the spray impingement zone of the drum. The dam was equipped with a gate which could be opened to allow emptying of the bed at the end of a run.

After the above tests, it was found that the gate in the dam was not sealing properly which caused a low hold-up and a high solids recycle rate. The dam was sealed and new runs were made with continuous sand feed and continuous product withdrawal. It was found possible to operate with no recycle. We discovered that this resulted in product with an even level of CMA coating. Operating conditions for this run are shown in Table III.

After 3.5 hours of operation, product that was removed was sieved into different size fractions and each fraction was analyzed for percent CMA coating. The results are shown in Table IV.

The results showed that the majority of the product was in the size range −6 to +20 mesh and that the coating level was reasonably uniform in this size range.

Continuous rector operation was demonstrated in other test runs. No unusual operation problems were encountered. Operating conditions are summarized in Table V.

As the data in Table V showed, there was an increase in pH between the reactor and the slurry tank, due to additional reaction with lime.

TABLE III

Continuous Operation of the Slurry Process for Coating Sand with CMA

| Feed Rates: | |
|---|---|
| No. 2 Sand, lb/hr | 105 |
| CMA Slurry, gpm | 0.33 |
| Slurry Conditions: | |
| Moisture, % | 68 |
| Temperature, °F. | 170 |
| Drum Operating Conditions: | |
| Dam | Gate closed and sealed |
| Inlet Air Temp. °F. | 550–570 |
| Outlet Air Temp. °F. | 164–175 |
| Spray atomization air, psig | 50 |
| Product Removal Rate, lb/hr | 140 |
| Product Analysis: | |
| Hours of Operation | % CMA |
| 0 (starting bed) | 26 |
| 1.5 | 25 |
| 2.5 | 31.5 |
| 3.5 | 27.8 |
| 4.5 | 36.5 |

TABLE IV

Size Distribution Versus Coating with CMA

| Mesh Size Tyler sieve No. | Weight % | % CMA |
|---|---|---|
| +6 | 1.9 | 63.0 |
| −6 + 10 | 8.8 | 47.5 |
| −10 + 12 | 21.2 | 35.3 |
| −12 + 14 | 30.2 | 26.9 |
| −14 + 20 | 34.0 | 18.7 |
| −20 + 28 | 3.0 | 24.5 |
| −28 | 0.8 | 42.2 |

TABLE V

Continuous Reactor Operating Results

| FEED RATES | |
|---|---|
| Mix Tank: | |
| Water, lb/hr | 146 |
| Lime, lb/hr | 37.5 |
| Reactor: | |
| Acetic Acid, lb/hr | 60.0 |
| OPERATING CONDITIONS | |
| Reactor: | |
| pH (undiluted) | 6.6–7.4 |
| Temperature, °F. | 155 |
| Moisture, % | 60 |
| Residence Time, minutes | 7.8 |
| Surge Tank: | |
| pH (undiluted) | 8.3 |

Example 4

Relationship Between Slurry pH and Product pH

During the course of making CMA coated sand compositions by procedures described in the above examples, we discovered that the product pH was significantly higher than the pH of the slurry from which it was made. Test were run to see what the product pH would be for operation with slurry that was slightly acidic. The slightly acidic slurry would be expected to give complete reaction of the lime leaving a minimum of insoluble material. It was discovered that slurry with a pH of 6.3 to 6.8 resulted in product with pH of 9.8 to 10.0. The results for operation with slurry pH from 6.3 to 6.8 are shown in Table VI.

Exit gas from the rotary drum was tested at the baghouse exit for acetic acid to determine if there was volatilization of acid. The results showed from 30 to 80 ppm acetic acid by volume, depending on slurry pH. With slurry pH levels of 6.6 or above, the exit gas acetic acid concentration was 30 ppm. With slurry pH levels of 6.3, the exit gas acid concentration was 80 ppm. Thus, apparently excess acid in the slurry was volatilized; however, there was some acid loss, even when there was no excess of acid in the slurry. These acid losses were quite small, however, based on the measured exit gas flowrate and measured concentrations of acetic acid in the exit gas of 30-50 ppm. It was calculated that the loss was less than 1 percentage of the total acetic acid in the product CMA. These acid losses were not a significant economic factor.

The pH increase during the coating operation was, nonetheless, not fully explained by the acid vapor losses described above and is thus surprising. (It is possible that a small amount of basic magnesium acetate was formed due to this acid loss but this did not appear to be a full explanation for the pH increases that were observed.) This pH increase was very beneficial and desirable, however, since a minimum of insoluble, unreacted lime was obtained due to neutralization to a neutral or slightly acidic final slurry pH but at the same time a product pH was obtained that had a pH high enough to avoid concrete scaling which may occur below pH 8 according to studies by R. W. Schenk "Ice-Melting Characteristics of Calcium Magnesium Acetate, Final Report, Executive Summary", February, 1985.

TABLE VI

| Run No. | Ca:Mg Mole Ratio | Substrate | Slurry pH* | Product pH |
|---|---|---|---|---|
| 46 | 5:5 | sand | 6.3 | 9.8 |
| 48 | 4:6 | sand | 6.7 | 10.0 |
| 45 | 3:7 | sand | 6.5 | 10.0 |
| 40 | 5:5 | CMA | 6.8 | 9.8 |
| 47 | 4:6 | CMA | 6.5 | 9.9 |
| 44 | 3:7 | CMA | 6.4 | 9.8 |

*1 Part slurry and 2 parts water.

Example 5

Preparation of Calcium Acetate Coated on Sand

The procedure outlined in Example 1 was followed using a high calcium-containing lime to produce calcium acetate that did not contain a high level of magnesium. Slurry was made according the procedure described in Example 1. Seventy (70) gallons of water were charged into the reaction tank and 150 pounds of High Calcium Hydrated Lime (Genstar Lime Co., San Mateo, Calif., 85% Ca(OH)$_2$ min.), were added. Two hundred (200) pounds of Glacial Acetic Acid were added gradually. Toward the end of the acid addition, the slurry became very thick. Two gallons of water was added to thin the slurry.

The procedure outlined in Example 1 was followed to convert the slurry to calcium acetate coated sand. The test run conditions and results are summarized in Table VII. No operating problems occurred. Forty-four pounds of dust were recycled to the slurry during the run. The results shown in Table VII show that the slurry process for coating sand with acetate salts gave results for calcium acetate that were similar to the results for calcium magnesium acetate. The slurry temperature was low, 82° to 94° F., and, therefore, the spray coating yield was low, 34 percent. This finding was consistent with the results for calcium magnesium acetate which gave low yields with low slurry temperatures.

TABLE VII

| Production of Sand Coated With Calcium Acetate | |
|---|---|
| Operating Conditions: | |
| Slurry Moisture, % | 66.8 |
| Slurry Temperature, °F. | 82 to 94 |
| Inlet Air Temp., °F. | 550 to 600 |
| Outlet Air Temp., °F. | 175 to 210 |
| Slurry Feedrate, gpm | 0.3 to 0.4 |
| Results: | |
| % Ca Acetate at end of run | 21.4% |
| Total Baghouse Dust, % of Feed | 66 |

Example 6

Preparation of High Magnesium Content CMA-Coated Sand

Referring to Table VIII, runs numbers 46, 48 and 45, procedures similar to those described in Example 1 were used to produce CMA-coated sand, however, a mixture of dolomitic lime and magnesium oxide was used to give a higher magnesium content. The magnesium oxide used was Grade 20, Type 325, (National Magnesia Corporation, Moss Landing, Calif.) In addition, slurry was made slightly acidic to obtain complete lime reaction. The slurry was heated prior to spraying to increase the spray yield.

As shown in Table VIII, the pH of the final product was from 9.8 to 10.0, thus the residual base level in the product was very low. The product also had a high crushing strength for the CMA coating and high product bulk densities.

Example 7

Preparation of "Neat-CMA"

Run numbers 35, 40, 47 and 44 of Table VIII, were made using procedures similar to Example 1 except that essentially no sand was used. The initial material was used to establish a bed of solid CMA particles in the rotary drum was obtained by crushing 56% CMA coated sand, and screening the crushed material on a 24 mesh screen to separate the CMA particles from the sand. The −24 mesh CMA particles were used as the starting bed. In commercial operation oversize product or a portion of the on size product could be crushed and recycled of the drum to provide small particles that could be coated by the slurry feed. Undersize particles could also be removed from the material that discharged from the drum by screening and then recycled with the crushed material.

As the data in Table VIII show, the bulk density of the product was from 38.4 to 44 lbs per cubic foot, lower than for the sand coated products, but high enough for good handling characteristics. In runs 35 and 40, a 24 mesh product screen was used which gave a small size product. In runs 47 and 44, a 10 mesh product screen was used which gave a much larger product. Even larger size product could be produced by using a product screen with larger openings. The crushing strength of the straight CMA pellets improved with higher slurry temperature operation (run 40) and with lower calcium to magnesium ratios (runs 47 and 44). The pellet attrition test showed very good resistance to attrition which showed that dust formation during handling of the product would not be a problem.

atomizing nozzle. Powdered lime, 1.79 pounds of Type S hydrated dolomitic lime was added to the wet sand. Using an atomizing nozzle, 2.47 pounds glacial acetic acid were sprayed on the sand-lime mixture. After the acid addition was complete, mixing was continued for about one-half hour.

Compositions prepared in accordance with the above procedure are disclosed as sample numbers 1 and 2 of Table IX.

Example 9

Preparation of Calcium Magnesium Acetate-Coated Sand Using a Rotary Drum Pelletizer-Dryer Calcium magnesium acetate-coated sand was prepared by the direct reaction process using a rotary drum pelletizer-dryer according to the following procedure:

A rotary drum pelletizer-dryer was charged with 500

TABLE VIII

Data from Pilot Plant Tests of Production of Calcium Magnesium Acetate Pellets by the Slurry Process

| Test Number | 46 | 48 | 45 | 35 | 40 | 47 | 44 |
|---|---|---|---|---|---|---|---|
| | Tests of sand coating with CMA utilizing high Temperature Slurry and Full Lime Neutralization | | | Straight CMA lime not fully neutralized | Tests of Straight CMA Pelletization utilizing High Temperature Slurry and Full Lime Neutralization | | |
| Ca:Mg Mole Ratio | 5:5 | 4:6 | 3:7 | 5:5 | 5:5 | 4:6 | 3:7 |
| TYPICAL CONDITIONS | | | | | | | |
| Slurry: | | | | | | | |
| Temperature, °F. | 175 | 180 | 170 | 167 | 174 | 180 | 180 |
| Moisture, percent | 67 | 65 | 67 | 64 | 67 | 65 | 64 |
| pH, (1 part + 2 parts H$_2$O) | 6.3 | 6.7 | 6.5 | 7.6 | 6.8 | 6.5 | 6.4 |
| Pelletizer Conditions: | | | | | | | |
| Inlet Air Temp., °F. | 515 | 525 | 525 | 550 | 550 | 500 | 485. |
| Outlet Air Temp., °F. | 160 | 157 | 160 | 170 | 165 | 165 | 165 |
| Sand Feed, lbs charged | 400 | 300 | 400 | trace | n.a. | n.a. | n.a. |
| Spray Atomizer Conditions: | | | | | | | |
| Slurry Flowrate, gpm | 0.4 | 0.4 | 0.39 | 0.28 | 0.3 | 0.35 | 0.3 |
| Air Pressure, psig | 40 | 30 | 20 | 35 | 25 | 25 | 20 |
| Spray Yield: | | | | | | | |
| Percent on pellets | — | — | 73 | — | — | — | — |
| Exit Air Conditions: | | | | | | | |
| Flowrate, scfm | — | — | — | — | — | — | 478 |
| Acetic acid, ppm | 80 | 70 | 54 | — | — | — | 37 |
| Pelletized Product Analysis: | | | | | | | |
| Final percent CMA | 56 | 33 | 55 | 94.6 | 100 | 100 | 100 |
| pH (1 part product to 9 parts water) | 9.8 | 10.0 | 10.0 | 9.8 | 9.8 | 9.9 | 9.8 |
| Moisture, percent | 1.8 | 1.1 | 3.5 | 8.0 | 9.1 | 3.0 | 6.1 |
| Screen analysis, percent: | | | | | | | |
| +6 mesh | trace | 0 | trace | 0 | 0 | trace | 1.3 |
| +8 mesh | 1.0 | trace | 0.5 | 2.7 | 1.3 | 18.0 | 29.3 |
| +10 mesh | 25.0 | 24.0 | 33.0 | 18.7 | 14.7 | 71.4 | 65.4 |
| +12 mesh | 55.0 | 61.5 | 57.0 | 19.3 | 16.7 | 9.3 | 3.3 |
| +16 mesh | 18.0 | 14.0 | 9.0 | 27.9 | 30.0 | 1.3 | 0.7 |
| +24 mesh | 1.0 | 0.5 | 0.5 | 14.7 | 22.0 | trace | trace |
| −24 mesh | trace | trace | trace | 16.7 | 15.3 | trace | trace |
| Bulk Density, lb/cu. ft | 59.1 | 69.1 | 55.5 | 43.0 | 44.0 | 40.3 | 38.4 |
| Crushing strength, lbs | 2.6 | 4.1 | 2.0 | 1.0 | 1.7 | 2.6 | 2.7 |
| Attrition, ASTM D 4058-81 | | | 3.0 | | | | |

Example 8

Preparation of Deicing Composition by Simultaneous Reaction and Coating Process Using a Cement Mixer Calcium magnesium acetate-coated sand was prepared by the direct reaction process using a cement mixer according to the following procedure.

Into the cement mixer, twenty-five (25) pounds of sand (No. 2 sandblasting grade) were placed. The internal lifters of the mixer created a dense curtain of sand. Water, one pound, was sprayed on the sand using an pounds of sand (No. 2 Sandblasting grade), so that sand was recirculated from the drum outlet to the drum inlet. Water was continuously sprayed on the sand in the front section of the drum, before the sand reached the lifters. Lime (Type S hydrated dolomitic), was continuously fed into the front section continuously (up to 48 pounds). After the wetted sand and dry lime mixture passed to the lifter section, acetic acid (up to 67 pounds) was sprayed on the mixture using an air atomizing spray nozzle. A flowable mass of discrete particles was obtained which had some acid odor.

A composition prepared in accordance with the above procedure is disclosed as Sample No. 3 in Table IX.

Example 10

Continuous Production of "Neat CMA"

A calcium-magnesium acetate (CMA) deicer was produced on a commercial scale by the following continuous process. Water was continuously added to a covered, agitated mix tank (at a rate sufficient to maintain about a 32 wt % CMA slurry on exiting the reaction chain) with approximately 1440 lb/hr of Type S hydrated dolomitic lime, and approximately 750 lb/hr of magnesium oxide. The magnesium oxide was added as a slurry with water prepared by drawing solid magnesium oxide into the throat of an eductor using water as the educting medium. The resultant mixture flowed by gravity through a series of four additional mixing vessels. One overflowing through a trough into the next.

Upon overflowing the fifth mix tank, glacial acetic acid was added at a rate of approximately 9.6 gal/min. to a reactor with thorough, high shear mixing, resulting in an exit pH of approximately 5.6. The reactor was vented through a high-energy wet scrubber to reduce acetic acid emissions to the environment. The water from this scrubber was continuously blown down and used as feed water to the first mix tank. As the slurry overflowed into the second reactor, a slight flow of additional acetic acid was added to maintain a slurry pH of approximately 6.0 in the slurry tank.

The overall average recipe for CMA slurry was:

| Acetic acid | 0.80 lbs/lb dried CMA |
|---|---|
| Type S lime | 0.23 lbs/lb dried CMA |
| Magnesium oxide | 0.11 lbs/lb dried CMA |

The resultant slurry was maintained at a temperature of approximately 186° F. and pumped through an atomizing nozzle and sprayed on a falling bed of CMA pellets in the front of a rolling drum. The drum was equipped with internal lifters, an internal dam and an external solids recycle system. Also included was an air system consisting of a fan, an inlet air heater and a baghouse dust collector on the outlet air. Air was introduced at a temperature of approximately 700° F., and a flow rate of approximately 29,000 standard cubic feet per minute (SCFM). The air exited the drum at approximately 151° F. and entered a baghouse for dust removal before entering the environment. The dust collected from the baghouse, approximately 1500 lb/hr, was recycled to the slurry tank and additional water added to maintain approximately a 68 wt % moisture slurry.

CMA pellets formed or enlarged in the drum were classified with a screening system. Pellets which did not pass a ⅜-inch screen were crushed and recycled to the front of the drum. Pellets which passed through a 30-mesh screen were also recycled. Approximately 5% of the pellets which were in the product range of ⅜ inch +30 mesh were withdrawn as product and moved to the warehouse, with the remaining 95% being recycled to the front of the drum.

Product produced from this run had a calcium/magnesium mol ratio of approximately 0.45 (i.e., 3.1 to 6.9 [about 1 to 2.2]), had a pH of about 9.5, and contained about 1.86 wt % water insoluble material.

Example 10A

Continuous Production of "Neat CMA"

A calcium magnesium acetate (CMA) deicer was produced on a commercial scale by the following continuous process.

Water was continuously added to an agitated mixing vessel (at a rate sufficient to maintain about 42 weight percent CMA slurry) on exiting the reactor train with approximately 2120 pounds/hour of Type S hydrated dolomitic lime and approximately 990 pounds/hour of magnesium oxide. The resulting mixture flowed by gravity through an additional mixing vessel, overflowing one through a trough into the next.

Upon overflowing the second mixing vessel, glacial acetic acid was added at a rate of approximately 11.3 gallons/minute to a reactor with thorough mixing, resulting in an exit pH of approximately 9. As the slurry overflowed into the second reactor, a slight flow of additional acetic acid was added to maintain a slurry pH of approximately 7.5 in the slurry tank. The reactors were vented through a high-energy wet scrubber to reduce acetic acid emissions to the environment. The water from this scrubber was continuously used as feed water to the first mixing vessel.

The overall formula for the CMA slurry was:

| Acetic Acid | 0.79 pounds/pound dried CMA |
|---|---|
| Type S Lime | 0.26 pounds/pound dried CMA |
| Magnesium Oxide | 0.12 pounds/pound dried CMA |

The resultant slurry was maintained at a temperature of approximately 190° F. (88° C.) and pumped through an atomizing nozzle and sprayed on a falling bed of CMA pellets in the front of a rolling drum. The drum was equipped with internal lifters, an internal dam and an external solids recycle system. Also included was an air system consisting of a fan, an inlet air heater and a baghouse dust collector on the outlet air. Air was introduced at a temperature of approximately 800° F. (427° C.), and a flow rate of approximately 32,000 standard cubic feet per minute (SCFM). The air exited the drum at approximately 200° F. (93° C.) and entered a baghouse for dust removal before entering the environment. The dust collected from the baghouse, approximately 500 pounds/hour, was recycled to the slurry tank and additional water added to maintain approximately a 58 weight percent moisture slurry.

After exiting the drum, CMA pellets formed or enlarged in the drum were classified with a screening system. Pellets which were larger than a 6-mesh screen were crushed and recycled to the front of the drum. Pellets which were smaller than an 8-mesh screen were also recycled. Approximately 5 percent of the pellets from the drum were in the product range of minus 6-mesh to plus 8-mesh and were withdrawn as product and moved to the warehouse, with the remaining 95 percent being recycled to the front of the drum.

Product packaged from this run had a calcium/magnesium mole ratio of approximately 0.46 (about 1 to 2.2), had a pH of about 9.5, and continued about 2.1 weight percent water insoluble material.

Example 11

CMA Preparation at Low Temperature

Lime (Type S dolomitic), magnesium oxide and water were combined in a beaker to give a slurry. Glacial acetic acid was added to the slurry. The resulting slurry was heated with stirring for ½ hour to give a final slurry temperature of about 130° to 140° F. The pH of the slurry was measured; if necessary, additional acetic acid was added to give a pH in the range of about 5.0 to 7.0. The slurry was filtered through filter paper to remove insolubles. The filtrate was dried overnight in a vacuum oven at about 95° to 100° C. to give the low temperature CMA samples.

Samples prepared in accordance with the above procedure are disclosed in Table IX.

TABLE IX

| | Samples Prepared According to Example 11 | | |
|---|---|---|---|
| Sample No. | Reagent | Amount (g) | Ca:Mg Ratio in Sample |
| B5669-23-1 | Lime | 10.0 | 5:5 |
| | MgO | 0.4 | |
| | Water | 108.04 | |
| | Acetic Acid | 18.56 | |
| B5669-23-2 | Lime | 5.00 | 3.3:6.7 |
| | MgO | 1.90 | |
| | Water | 100.68 | |
| | Acetic Acid | 14.36 | |

Example 12

Measurement of Crush Strength

Crush strength of the CMA layer of deicing compositions was measured using a Chatilon DPP-1 force gauge (durometer). One revolution around the gauge equaled a force of 10 lb$_f$ (divisions were in 0.1 lb$_f$ increments). The particle to be tested was placed on a lab jack immediately below the plunger/disc assembly of the force gauge. The lab jack was raised using the height adjustment screw until the particle to be tested was held in place. The force gauge was zeroed. Pressure was applied to the particle until the CMA layers broke; the force reading at that point was taken. Results are tabulated in Table X.

Example 13

Measurement of Attrition Resistance

The attrition resistance of CMA deicing compositions were measured using ASTM method D 4058-81.

The results for various CMA compositions, reported in percent loss on attrition are tabulated in Table X.

TABLE X

| Sample Number | Sample Id. | CMA, % (CA:MA ratio) | Substrate | Equipment Type[1] | Reaction Type | Crush Strength, lb$_f$ | Attrition, % | $\frac{\% \text{ Attrition}}{\% \text{ CMA}} \times 100$ |
|---|---|---|---|---|---|---|---|---|
| 1 | B8105-08-1 | 11 (5:5) | sand | C | direct | 2.1 | 10.2 | 92.7 |
| 2 | B8105-02-1 B8105-08-2 | 10 (5:5) | sand | C | direct | 3.2 | 4.8 | 48.0 |
| 3 | B8105-02-2 B8105-08-3 | 16 (5:5) | sand | P | direct | 5.4 | 1.7 | 10.6 |
| 4 | B8105-02-3 | 29.6 (5:5) | sand | P | slurry | 5.2 | 2.4 | 8.1 |
| 5 | B8105-08-4 | 36.8 (5:5) | sand | P | slurry | 5.1 | 2.0 | 5.4 |
| 6 | B8105-08-5 | 56 (5:5) | sand | P | slurry | 3.5 | 1.2 | 2.1 |
| 7 | B8105-02-4 B8105-08-6 | 100 (5:5) | CMA | P | slurry | 2.8 | 2.8 | 2.8 |
| 8 | — | 29.5 (3:7) | sand | P | slurry | — | 0.8 | 2.7 |
| 9 | B8105-02-5 | 100 (3:7) | CMA | P | slurry | — | 3.0 | 3.0 |
| 10 | B8105-11-1 | 28.5 (5:5) | sand | P | slurry (low temp) | — | 2.8 | 9.8 |
| 11 | B8105-11-2 | 30.5 (5:5) | sand | P | slurry (low temp) | — | 2.5 | 8.2 |
| | Sand (No. 2 Sandblasting grade) | | sand | — | — | >15 | | |

[1] C = Cement Mixer/Separate Dryer
P = Rotary Drum Pelletizer-Dryer

Example 14

Evolved Gas Analysis by TGA-GC-MSD

CMA samples produced by both the direct reaction and slurry process (Examples 1 to 9) were compared using Evolved Gas Analysis by TGA-GC-MSD. This technique took the evolved gases from a stand aid thermogravimetric analyzer (TGA) as they were produced over time and subjected the gases to capillary tube gas chromatography (GC). The gases at the end of the GC column were recorded using a mass selective detector (MSD). The total ion count at several preset masses was monitored overtime. Typical analyses ran about 50 minutes.

The TGA used was a DuPont 951 TGA which was set up so it was controlled by a Northstar microcomputer. The GC-MSD was a Hewlett Packard 5890A GC equipped with a 5970 quadruple MSD. The GC used either a 15- or a 50-meter SC-32 capillary column (cross-linked methyl silicone, 0.33 micron film thickness, 0.30 micron internal diameter). The TGA outlet was connected to the GC injector. The GC inlet system was set at a 100:1 ratio. All transfer lines between the TGA and the GC injector were wrapped with heating tape.

The GC-MSD continuously monitored the TGA evolved gases.

To detect untreated magnesium base, gas evolution at mass 18 (water) was monitored. At a temperature at about 300° C., or after about 14 to 16 minutes in the TGA, heating at a rate of 20° C./minute, the reaction of magnesium hydroxide (or hydrated magnesium oxide) to magnesium oxide was observable. Based on standards using pure magnesium hydroxide, the lower limit for detection of unreacted magnesium base by this method was about 1 weight percent.

Samples of CMA prepared according to the direct reaction process method (of Examples 8 and 9) showed approximately 5 weight percent (of the CMA) as unreacted magnesium base.

Samples of CMA prepared according to the slurry process method (of Examples 1 to 7) showed essentially no detectable magnesium base.

What is claimed is:

1. A process for preparing a deicing composition which comprises:
   (a) preparing a slurry comprising an alkaline earth or alkali metal carboxylate of from 1 to 4 carbon atoms, or mixtures thereof, said slurry containing sufficient water that it is fluid and pumpable and heating said slurry to a temperature in the range of about 100° F. to about 250° F.;
   (b) maintaining said slurry at a temperature within said range while distributing said slurry of step (a) in a thin layer on discrete substrate particles; and
   (c) drying said layered substrate particles.

2. A process according to claim 1 wherein said distributing and drying steps are repeated to give a plurality of thin layers of carboxylate on said substrate particles.

3. A process according to claim 2 wherein said layered substrate particles are recycled through said distributing and drying steps to give a plurality of layers of carboxylate on said substrate particles.

4. A process according to claim 3 wherein said alkaline earth or alkali metal carboxylate comprises a calcium, magnesium, calcium magnesium or potassium carboxylate or mixtures thereof.

5. A process according to claim 4 wherein step (b) further comprises heating said slurry to a temperature of about 170° F. to about 200° F. before distributing it.

6. A process according to claim 5 wherein said slurry comprises at least about 50% by weight water.

7. A process according to claim 6 wherein said alkaline earth or alkali metal carboxylate comprises calcium magnesium acetate.

8. A process according to claim 6 wherein said substrate comprises a traction aid.

9. A process according to claim 6 wherein said substrate comprises particles of alkaline earth or alkali metal carboxylate having from 1 to 4 carbon atoms.

10. A process of preparing a deicing composition which comprises:
    (a) mixing an alkaline earth or alkali metal base or mixtures thereof and water to give a slurry;
    (b) adding carboxylic acid of 1 to 4 carbon atoms or mixtures thereof in an amount sufficient to convert said alkaline earth or alkali metal base into alkaline earth or alkali metal carboxylate to the slurry of step (a) to give an alkaline earth or alkali metal carboxylate slurry, said slurry containing sufficient water that it is fluid and pumpable;
    (c) heating the slurry of step (b) to a temperature of about 100° F. to about 250° F.;
    (d) distributing the heated slurry from step (c) in a thin layer on discrete substrate particles; and
    (e) drying said layered substrate particles.

11. A process according to claim 10 wherein said slurry contains at least about 50% water.

12. A process according to claim 11 wherein said layered substrate particles are recycled through said distributing and drying steps to give a plurality of layers of carboxylate on said substrate particles.

13. A process according to claim 12 wherein said alkaline earth or alkali metal carboxylate comprises calcium acetate, magnesium acetate, calcium magnesium acetate, potassium acetate or mixtures thereof.

14. A process according to claim 13 wherein said slurry contains from about 55% to about 68% by weight water.

15. A process according to claim 14 wherein said slurry of step (b) is heated to a temperature of about 170° F. to about 200° F.

16. A process according to claim 15 wherein steps (d) and (e) are performed substantially simultaneously.

17. A process of preparing a deicing composition comprising calcium magnesium acetate having a molar ratio of calcium:magnesium of from about 6:4 to about 2:8 which is substantially free from unreacted magnesium base which comprises:
    (a) mixing CM base and water to give a mixture comprising at least about 40 percent by weight water;
    (b) adding acetic acid in an amount sufficient to convert said CM base to calcium magnesium acetate to the mixture of step (a) to give a calcium magnesium acetate slurry comprising from about 50 to about 68% water and a pH of about 7 to about 8.5 which is essentially free of acetic acid odor;
    (c) heating the slurry of step (b) to a temperature of about 170° F. to about 200° F.;
    (d) distributing the heated slurry of step (c) in a thin layer onto a falling curtain of discrete substrate particles in the presence of heated gas to give CMA-layered particles;
    (e) repeating step (d) to give CMA-layered particles having a plurality of layers of CMA on said particles.

18. A process according to claim 17 wherein said CM base comprises dolomitic lime and optionally a magnesium base.

19. A process according to claim 18 wherein said substrate particles comprise a traction aid.

20. A process according to claim 19 wherein said traction aid is sand.

21. A process according to claim 17 wherein said substrate particles comprise particles of calcium magnesium acetate.

22. A deicing composition substantially free from unreacted alkaline earth metal base or alkali metal base comprising an alkaline earth or alkali metal carboxylate prepared according to the process of claim 1.

23. A deicing composition substantially free from unreacted magnesium base comprising an alkaline earth or alkali metal carboxylate prepared according to the process of claim 4.

24. A deicing composition comprising an alkaline earth or alkali metal carboxylate prepared according to the process of claim 5.

25. A deicing composition substantially free from unreacted magnesium base comprising an alkaline earth or alkali metal carboxylate prepared according to the process of claim 7.

26. A deicing composition substantially free of unreacted magnesium base comprising an alkaline earth or alkali metal carboxylate prepared according to the process of claim 8.

27. A deicing composition substantially free of unreacted magnesium base comprising an alkaline earth or alkali metal carboxylate prepared according to the process of claim 9.

28. A deicing composition comprising an alkaline earth or alkali metal carboxylate prepared according to the process of claim 15.

29. A deicing composition comprising an alkaline earth or alkali metal carboxylate prepared according to the process of claim 13.

30. A deicing composition substantially free of unreacted magnesium base comprising an alkaline earth or alkali metal carboxylate prepared according to the process of claim 16.

31. A deicing composition substantially free of unreacted magnesium base comprising an alkaline earth or alkali metal carboxylate prepared according to the process of claim 17.

32. A deicing composition substantially free of unreacted magnesium base comprising an alkaline earth or alkali metal carboxylate prepared according to the process of claim 20.

33. A deicing composition comprising an alkaline earth or alkali metal carboxylate prepared according to the process of claim 21.

34. A deicing composition which comprises a plurality of calcium magnesium acetate layers which are substantially free of unreacted magnesium base on discrete substrate particles.

35. A deicing composition according to claim 34 without a wetting agent.

36. A deicing composition according to claim 35 comprising calcium magnesium acetate having a calcium:magnesium molar ratio of from about 6:4 to about 2:8.

37. A deicing composition according to claim 36 wherein said substrate particles comprise a traction aid.

38. A deicing composition according to claim 37 wherein said traction aid is sand.

39. A deicing composition according to claim 38 wherein said calcium-magnesium molar ratio is about 1:1.

40. A deicing composition according to claim 38 wherein said calcium-magnesium molar ratio is about 3:7.

41. A deicing composition according to claim 36 wherein said substrate particles comprise calcium magnesium acetate.

42. A deicing composition according to claim 41 wherein said calcium-magnesium molar ratio is about 1:1.

43. A deicing composition according to claim 41 wherein said calcium-magnesium molar ratio is about 3:7.

44. A deicing composition having good crush strength a bulk density of at least about 40 pounds per cubic foot, a particle specific gravity greater than about 1.2 and less than about 3 percent attrition which comprises an alkaline earth or alkali metal carboxylate having from 1 to 4 carbon atoms or mixtures thereof which comprises a plurality of thin layers of carboxylate distributed on discrete substrate particles without a wetting agent.

45. A deicing composition according to claim 44 wherein said alkaline earth or alkali metal carboxylate comprises calcium acetate, magnesium acetate, potassium acetate, calcium magnesium acetate or mixtures thereof.

46. A deicing composition according to claim 45 having a molar ratio of calcium:magnesium of about 6:4 to about 2:8.

47. A deicing composition according to claim 46 which is substantially free of unreacted magnesium base.

48. A deicing composition according to claim 47 wherein said alkaline earth or alkali metal carboxylate comprises calcium magnesium acetate.

49. A deicing composition according to claim 48 having a calcium:magnesium ratio of about 1:1.

50. A deicing composition according to claim 49 wherein said substrate particles comprise a traction aid.

51. A deicing composition according to claim 50 wherein said substrate particles comprise calcium magnesium acetate particles.

52. A deicing composition according to claim 48 having a calcium-magnesium molar ratio of about 3:7.

53. A deicing composition according to claim 52 wherein said substrate comprises a traction aid.

54. A deicing composition according to claim 52 wherein said substrate comprises calcium magnesium acetate particles.

55. A deicing composition according to claim 44 wherein said substrate particles comprise alkaline earth or alkali metal carboxylate of 1 to 4 carbon atoms or mixtures thereof.

56. A deicing composition having good crush strength and resistance to attrition which comprises calcium magnesium acetate which is substantially free of unreacted magnesium base layered on discrete substrate particles.

57. A deicing composition according to claim 56 having a bulk density of at least about 40 pounds per cubic foot, a particle specific density of at least about 1.2 and attrition of less than about 3 percent.

58. A deicing composition according to claim 57 having a calcium:magnesium molar ratio of from about 6:4 to about 2:8.

59. A deicing composition according to claim 58 wherein said substrate particles comprise preformed calcium magnesium acetate particles.

60. A deicing composition according to claim 58 wherein said substrate particles comprise a traction aid.

* * * * *